(12) United States Patent
Lischefski et al.

(10) Patent No.: US 8,449,984 B2
(45) Date of Patent: May 28, 2013

(54) BREATHABLE PACKAGING FILM HAVING ENHANCED THERMOFORMABILITY

(75) Inventors: Andrew John Lischefski, Tampere (FI); Kevin Philip Nelson, Appleton, WI (US)

(73) Assignee: Curwood, Inc., Oshkosh, WI (US)

( * ) Notice: Subject to any disclaimer, the term of this patent is extended or adjusted under 35 U.S.C. 154(b) by 0 days.

(21) Appl. No.: 12/326,959

(22) Filed: Dec. 3, 2008

(65) Prior Publication Data
US 2009/0081439 A1    Mar. 26, 2009

Related U.S. Application Data

(63) Continuation-in-part of application No. 10/991,038, filed on Nov. 17, 2004, now abandoned.

(51) Int. Cl.
| | |
|---|---|
| B32B 27/06 | (2006.01) |
| B32B 27/08 | (2006.01) |
| B32B 27/30 | (2006.01) |
| B32B 27/32 | (2006.01) |
| B32B 27/36 | (2006.01) |

(52) U.S. Cl.
USPC ........... 428/483; 428/332; 428/339; 428/343; 428/346; 428/347; 428/349; 428/355 EN; 428/480; 428/500; 428/515; 428/516; 428/520; 428/522; 428/523

(58) Field of Classification Search
None
See application file for complete search history.

(56) References Cited

U.S. PATENT DOCUMENTS

| | | | |
|---|---|---|---|
| 3,023,192 A | 2/1962 | Shivers, Jr. | |
| 3,261,812 A | 7/1966 | Bell et al. | |
| 3,649,143 A * | 3/1972 | Papesh et al. | 425/133.1 |
| 3,651,014 A | 3/1972 | Witsiepe | |
| 4,003,882 A | 1/1977 | Fagerburg et al. | |
| 4,197,326 A * | 4/1980 | Wakamatsu et al. | 426/412 |
| 4,203,888 A | 5/1980 | Rashbrook | |
| 4,221,703 A | 9/1980 | Hoeschele | |
| 4,302,565 A | 11/1981 | Goeke et al. | |
| 4,302,566 A | 11/1981 | Karol et al. | |
| 4,349,469 A | 9/1982 | Davis et al. | |
| 4,351,876 A | 9/1982 | Doi et al. | |
| 4,363,841 A | 12/1982 | Snow | |

(Continued)

FOREIGN PATENT DOCUMENTS

| | | |
|---|---|---|
| EP | 220619 A1 | 10/1985 |
| EP | 322364 A1 | 12/1988 |

(Continued)

OTHER PUBLICATIONS

Schimtz, Peter et al., "Films." Ullmann's Encyclopedia of Industrial Chemistry, 5th Ed., vol. A11 (1988), pp. 85-110.*

(Continued)

*Primary Examiner* — Vivian Chen
(74) *Attorney, Agent, or Firm* — Tom J. Hall (57) ABSTRACT

The present invention describes thermoformable coextruded film suitable for use in packaging applications having at least a first polymeric layer serving as an outermost exterior-film layer and comprising a cycloaliphatic polyester, an aromatic polyester or blends thereof; a second polymeric layer serving as a thermoforming-assist layer and comprising a polyolefin; and a third polymeric layer serving as an innermost exterior-film layer and comprising a heat-sealing polyolefin material. The films of the present invention are oxygen-permeable in that they exhibit an oxygen transmission rate of between 32-1000 $cm^3$/100 $in^2$/24 h. atm.

16 Claims, 2 Drawing Sheets

U.S. PATENT DOCUMENTS

| | | | |
|---|---|---|---|
| 4,559,266 A * | 12/1985 | Misasa et al. | 428/341 |
| 4,636,412 A * | 1/1987 | Field | 604/408 |
| 4,741,957 A * | 5/1988 | Park | 428/349 |
| 4,800,115 A * | 1/1989 | Havens | 428/178 |
| 4,946,743 A * | 8/1990 | Winter | 428/349 |
| 5,006,378 A * | 4/1991 | Itaba et al. | 428/34.9 |
| 5,026,798 A | 6/1991 | Canich | |
| 5,075,152 A | 12/1991 | Tsukuda et al. | |
| 5,185,203 A | 2/1993 | Itaba et al. | |
| 5,209,972 A * | 5/1993 | Super et al. | 428/349 |
| 5,213,900 A * | 5/1993 | Friedrich | 428/474.4 |
| 5,215,826 A | 6/1993 | Shimanski et al. | |
| 5,324,467 A * | 6/1994 | Anderson, II | 264/173.15 |
| 5,427,807 A * | 6/1995 | Chum et al. | 426/393 |
| 5,622,780 A * | 4/1997 | Paleari | 428/328 |
| 5,637,366 A * | 6/1997 | Davis et al. | 428/35.8 |
| 5,685,128 A * | 11/1997 | Chum et al. | 53/441 |
| 5,695,840 A | 12/1997 | Mueller | |
| 5,716,715 A | 2/1998 | Degrassi et al. | |
| 5,728,249 A * | 3/1998 | Kinsey et al. | 156/275.1 |
| 5,804,675 A | 9/1998 | Latiolais et al. | |
| 5,830,545 A | 11/1998 | Frisk | |
| 5,874,155 A * | 2/1999 | Gehrke et al. | 428/134 |
| 5,885,699 A | 3/1999 | Watson et al. | |
| 6,221,191 B1 | 4/2001 | Davis et al. | |
| 6,333,094 B1 | 12/2001 | Schneider et al. | |
| 6,394,783 B1 * | 5/2002 | Dalgewicz et al. | 425/388 |
| 6,395,321 B1 * | 5/2002 | Shaft et al. | 426/410 |
| 6,472,081 B1 | 10/2002 | Tsai et al. | |
| 6,511,755 B1 * | 1/2003 | Mochizuki et al. | 428/516 |
| 6,576,309 B2 * | 6/2003 | Dalgewicz, III | 428/36.8 |
| 6,589,616 B2 * | 7/2003 | Muggli et al. | 428/35.2 |
| 6,607,834 B2 | 8/2003 | Davis et al. | |
| 6,630,237 B2 * | 10/2003 | Rivett et al. | 428/355 EN |
| 6,632,521 B2 * | 10/2003 | Christopherson et al. | 428/336 |
| 6,656,548 B1 * | 12/2003 | Beckwith et al. | 428/34.9 |
| 6,667,101 B2 | 12/2003 | Silagy et al. | |
| 6,753,053 B2 | 6/2004 | Futagawa et al. | |
| 6,773,735 B1 * | 8/2004 | Dalgewicz, III | 426/127 |
| 6,814,905 B1 * | 11/2004 | Dalgewicz et al. | 264/37.32 |
| 6,814,913 B2 * | 11/2004 | Mueller | 264/173.13 |
| 7,037,576 B2 * | 5/2006 | Willham et al. | 428/214 |
| 7,413,812 B2 * | 8/2008 | Albe | 428/515 |
| 7,569,276 B2 * | 8/2009 | Kendig et al. | 428/423.7 |
| 2002/0094942 A1 | 7/2002 | Danneels et al. | |
| 2002/0187290 A1 | 12/2002 | Hodson et al. | |
| 2003/0170479 A1 | 9/2003 | Peiffer et al. | |
| 2004/0017851 A1 | 1/2004 | Haskell et al. | |
| 2005/0164018 A1 * | 7/2005 | Komada | 428/451 |
| 2006/0105166 A1 * | 5/2006 | Lischefski et al. | 428/349 |

FOREIGN PATENT DOCUMENTS

| | | | |
|---|---|---|---|
| EP | 1207042 A1 | | 5/2002 |
| EP | 1396337 A1 | | 3/2004 |
| JP | 05-309798 | * | 11/1993 |
| JP | EP 0 924 062 | * | 6/1999 |
| WO | 0071328 A1 | | 11/2000 |
| WO | 0153085 A1 | | 7/2001 |

OTHER PUBLICATIONS machine translation of JP 05-309798 (2009).*
Standard Test Method for Oxygen Gas Transmission Rate Through Plastic Film and Sheeting Using a Coulometric Sensor, D3985-05, ASTM International, 2005, 1-7, West Conshohocken.

* cited by examiner

BREATHABLE PACKAGING FILM HAVING ENHANCED THERMOFORMABILITY

RELATED APPLICATION

This application is a continuation-in-part of U.S. patent application Ser. No. 10/991,038, filed Nov. 17, 2004 abandoned, which is incorporated herein by reference in its entirety.

FIELD OF THE INVENTION

The present invention generally relates to food packaging films, and particularly, to thermoformable coextruded packaging films having special utility in the packaging of fresh poultry, meats, fruits and vegetables.

BACKGROUND OF THE INVENTION

Thermoforming and other similar techniques are well known in the art for packaging products. Suitable thermoforming methods, for example, include a vacuum forming or plug-assist vacuum forming method. In the vacuum forming method, a first film is heated, for example, by a contact heater and a vacuum is applied beneath the film causing the web to be pushed by atmospheric pressure down into a preformed mold. In a plug-assist vacuum forming method, after the first or forming film has been heated and sealed across a mold cavity, a plug shape similar to the mold shape impinges on the forming film and, upon the application of vacuum, the forming film transfers to the mold surface. After the forming film is in place, a product is placed, such as by manual loading, on the forming film and a second, substantially non-thermoforming film is disposed over the product. At a sealing station, the packages are evacuated and fusion sealed with a sealing device such as a heated jaw. The first or thermoforming film encloses a substantial portion, generally more than half, of the product to be packaged.

Thermoforming is a popular method of making packaging for food products, particularly, fresh and frozen meats. In the packaging of such products, it is desirable to allow oxygen to permeate a film or package so as to contact the meat product contained therein. For example, a package utilizing a permeable film can permit oxygen to permeate to a fresh red meat in the package, thereby allowing the meat product to oxygenate (often referred to as blooming which causes the meat color to change from purple to a consumer desirable red color). This can enhance consumer appeal, and retail vendors of such meat products demand this type of capability. Additionally, many types of produce require the presence of oxygen to suppress anaerobic spoilage.

Also in packaging of such products, it is desirable to provide a clear package to permit observation of the enclosed product with the packaging having good optical properties such as clarity and gloss in order to enhance package appearance for the consumer.

Notwithstanding the fairly high state of development in the art, packaging manufacturers are continually striving to improve the functionality of their packaging materials.

SUMMARY OF THE INVENTION

This present invention relates to thermoformable coextruded packaging films which provide oxygen permeability, improved thermoformability and good optical characteristics. It is a more particular object of the present invention to provide a material for packaging food products requiring oxygen permeability such as, for example, fresh poultry, fresh and frozen red meat and fresh produce. The present invention provides such films which have an oxygen transmission rate at 73° F. (23° C.) and 0% R.H. of between 2-1000 $cm^3$/100 $in^2$/24 h. (31-15,500 $cm^3/m^2$/24 h.) as measured in accordance with ASTM D-3985-02 test method.

It is another object of the present invention to provide a coextruded packaging film having improved thermoformability. The present invention provides such thermoformable multilayer films which are particularly well suited for forming a package in which the film is molded into a cavity in which a product may be placed. Such multilayer films may be characterized as having a linear free shrink at 80° C. of 0-5% in both the machine and transverse directions as measure in accordance with ASTM D-2732-96 test method.

It is yet another object of the present invention to provide a thermoformable coextruded packaging film which exhibits exceptional optical properties. The present invention provides multilayer films having a gloss value at 45° of at least 60 as measured in accordance with ASTM D-2457-03 test method and a haze value of less than 20% as measured in accordance with ASTM D-1003-00 test method.

Such objects generally are achieved by a thermoformable coextruded packaging film having a multilayer film structure comprising at least three polymeric layers which includes a first polymeric layer as an outermost exterior-film layer comprising a polyester, such as, aliphatic polyesters, cycloaliphatic polyesters, an aromatic polyester, or blends thereof, a second polymeric layer as an interior-film, thermoforming-assist layer comprising homopolymers or copolymers of polyolefin, preferably, a non-oriented polypropylene or cross-linked polyethylene, and a third polymeric layer as an innermost exterior-film layer comprising a heat-sealing polyolefin.

Such objects more particularly may be achieved by above-described film structures which include at least a first polymeric layer comprising a polyester selected from the group consisting of aliphatic polyester, cycloaliphatic esters, an aromatic ester derived from homopolymers and copolymers of alkyl-aromatic esters, such as, for example, polyethylene terephthalate ("PET"), amorphous polyethylene terephthalate ("APET"), crystalline polyethylene terephthalate ("CPET"), glycol-modified polyethylene terephthalate ("PETG"), and polybutylene terephthalate; copolymers of isophthalate, such as, polyethylene terephthalate/isophthalate copolymer, or blends of any of the aforementioned materials; a second polymeric layer comprising a non-oriented polypropylene, and a third polymeric layer comprising a heat sealable polyethylene. The films may include layers in addition to those described above. For instance, the multilayer films of the present invention may include a film structure comprising a fourth polymeric layer which function as a tie layer positioned between the first polymeric layer and the second polymeric layer. Preferably, the fourth or tie layer includes a material derived from polyalkyl acrylate copolymers, more preferably, ethylene/alkyl acrylate copolymers, and most preferably, a material selected from the group consisting of ethylene/methyl acrylate copolymer ("E/MA"), ethylene/ethyl acrylate copolymer ("E/EA"), ethylene/butyl acrylate copolymer ("E/BA"), and ethylene/methyl acrylate copolymer ("E/MA").

These and other aspects, advantages, and features of the invention will be more readily understood and appreciated by reference to the detailed description of the invention and the drawings.

DETAILED DESCRIPTION OF THE INVENTION

As used herein, the term "film" is used in the generic to include plastic web, regardless of whether it is a film or sheet.

As used herein, the phrase "thermoplastic" refers to a polymer or polymer mixture that softens when exposed to heat and returns to its original condition when cooled to room temperature. In general, thermoplastic materials include, but are not limited too, synthetic polymers such as polyesters, polyolefins, polyamides, polystyrenes, and the like. Thermoplastic materials may also include synthetic polymers that are cross-linked by either radiation or chemical reaction during a manufacturing or post-manufacturing process operation.

As used herein, the term "polymeric" refers to a material which is the product of a polymerization reaction of natural, synthetic, or natural and synthetic ingredients, and is inclusive of homopolymers, copolymers, terpolymers, etc. In general, the layers of a film or substrate may comprise a single polymer, a mixture of a single polymer and non-polymeric materials, a combination of two or more polymeric materials blended together, or a mixture of a blend of two or more polymeric materials and non-polymeric materials.

As used herein, the term "copolymer" refers to polymers formed by the polymerization reaction of at least two different monomers. For example, the term "copolymer" includes the copolymerization reaction product of ethylene and a α-olefin, such as 1-hexene. The term "copolymer" is also inclusive of, for example, the co-polymerization of a mixture of ethylene, propylene, 1-butene, 1-hexene, and 1-octene. As used herein, a copolymer identified in terms of a plurality of monomers, e.g., "propylene/ethylene copolymer", refers to a copolymer in which either monomer may copolymerize in a higher weight or molar percent than the other monomer or monomers. However, the term "copolymer" as applied to film layers of the present invention refers to the first listed monomer polymerized in a higher weight percent than the second listed monomer.

As used herein, terminology employing a "/" with respect to the chemical identity of a copolymer (e.g., polyvinylidene chloride/methyl acrylate copolymer), identifies the comonomers which are copolymerized to produce the copolymer.

As used herein, the phrase "oxygen transmission rate@" also known as "OTR" is measured according to ASTM D-3985-02 test method, a test known to those skilled in the art. The oxygen transmission rate refers to the quantity of oxygen gas passing through a unit area of the parallel surfaces of a film per unit time under the conditions of test, i.e., $cm^3/100$ in.$^2$/24 h, or $cm^3/m^2/24$ h. The OTR of a film is measured after the film sample has equilibrated in a dry test environment and at standard temperature and pressure conditions (STP) or at temperature and/or pressure conditions as stated otherwise. Standard temperature and pressure conditions for measuring oxygen transmission rate are 73° F. (23° C.) and 1 atmosphere of pressure (01013 MPa). The "dry" environment is considered to be one in which the relative humidity is less than 1%.

As used herein, the term "thermoformable" as applied to the present invention refers to films which are capable of being formed into a desired shape upon the application of heat, and are thermoformed about the product on a support member by means of heat and differential pressure. In the thermoforming process, virtually all of the air is evacuated from the interior of the package so that the film conforms very closely to the contour of the packaged product.

As used herein, the expression "non-oriented" means that a film or film layer undergoes no or very little stretching or orientation in any direction other than may occur as a result of the normal feeding or conveyance of the layers or film through the process equipment during processing. This is in contrast to the intentional stretching of the sheet or film as might occur in producing oriented films, such as uniaxially and biaxially oriented films. If the film or a film layer forming the film is oriented, it may be oriented in either the machine direction or transverse direction or both the machine and transverse directions. It will be recognized by those skilled in the art that some oriented films or oriented layers forming a film are not thermoformable. An example of a non-thermoformable film includes those films comprising one or more layers of biaxially oriented polypropylene.

As used herein, the phrase "unrestrained linear thermal shrinkage", also known as "linear free heat shrinkage", refers to the irreversible and rapid reduction in linear dimension in a specified direction occurring in film subjected to elevated temperatures under conditions where nil or negligible restraint to inhibit shrinkage is present. It is normally expressed as a percentage of the original dimension. As a result of the manufacturing process, internal stresses may be locked into the film which can be released by heating. The temperature at which shrinkage will occur is related to the processing techniques employed to manufacture the film and may also be related to a phase transition in the base resin. Thermoformable films according to the present invention may be characterized as having a low unrestrained linear thermal shrinkage, preferably, an unrestrained linear thermal shrinkage at 80° C. of less than 20%, more preferably, less than 10%, and most preferably, between 0-5% in both the machine and the transverse directions, as measured in accordance with ASTM D-2732-96 test method.

As used herein, the term "coextrusion" refers to the process of extruding two or more materials through a single die with two or more orifices arranged so that the extrudates merge and weld together into a laminar structure before chilling (chilling may also be termed quenching). The thermoformable films of the present invention may be formed using a coextrusion process, preferably, blown film coextrusion, cast film coextrusion, or extrusion coating, more preferably, blown film coextrusion, cast film coextrusion, and most preferably, blown film coextrusion.

As used herein, the term "polyester" refers to homopolymers or copolymers having an ester linkage between monomer units which may be formed, for example, by condensation polymerization reactions between a dicarboxylic acid and a glycol. The ester can be represented by the general formula: [R—(O)O—R'] where R and R'=alkyl group. The dicarboxylic acid may be linear or aliphatic, i.e., oxalic acid, maleic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of aliphatic polyesters include, but are not limited to, polylactic acid (PLA) homopolymer and copolymers, and those described in U.S. Pat. No. 7,422,782, which is incorporated herein by reference in its entirety. Exemplary of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthopbthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. Suitable materials of aromatic polyesters for use in the present invention include, but are not limited to, polyethylene terephthalate (PET), amorphous polyethylene terephthalate (APET), crystalline polyethylene terephthalate (CPET), glycol-modified polyethylene terephthalate (PETG), and polybutylene terephthalate; copolymers of isophthalate, such as, polyethylene terephthalate/isophthalate copolymer; and the like.

As used herein, the phrase "cycloaliphatic polyester" refers to copolymers derived from a dicarboxylic acid component consisting of 1,4-cyclohexanedicarboxylic, a diol component consists of 1,4-cyclohexanedimethanol and polytetramethylene ether glycol. Cycloaliphatic polyesters are well known in the art and are described, for example, in U.S. Pat. Nos. 3,023,192; 3,261,812; 3,651,014; 4,003,882; 4,221,703; and 4,349,469, all of which are incorporated herein by reference.

As used herein, the phrase "polyolefin" refers to homopolymers, copolymers, including e.g. bipolymers, terpolymers, block copolymer, grafted copolymers, etc., having a methylene linkage between monomer units which may be formed by any method known to those skill in the art. Examples of polyolefins include polyethylene ("PE") which include, but are not limited to, low-density polyethylene "(LDPE"), linear low-density polyethylene ("LLDPE"), very low-density polyethylene ("VLDPE"), ultra low-density polyethylene ("ULDPE"), medium-density polyethylene ("MDPE"), high-density polyethylene ("HDPE"), ultra high-density polyethylene ("UHDPE"), and polyethylenes comprising ethylene/α-olefin ("E/AO") which are copolymers of ethylene with one or more α-olefins (alpha-olefins) such as butene-1, hexene-1, octene-1, or the like as a comonomer, and the like.

As used herein, the phrase "ethylene/α-olefin", also known as "EAO" refers to a modified or unmodified copolymer produced by the co-polymerization of ethylene and any one or more α-olefin. The α-olefin in the present invention has between 3-20 pendant carbon atoms, preferably, 3-12 pendant carbon atoms and more preferably, 3-6 pendant carbon atoms. The co-polymerization of ethylene and an α-olefin may be produced by heterogeneous catalysis, i.e., co-polymerization reactions with Ziegler-Natta catalysis systems, for example, metal halides activated by an organometallic catalyst, i.e., titanium chloride, optionally containing magnesium chloride, complexes to trialkyl aluminum and may be found in patents such as U.S. Pat. No. 4,302,565 to Goeke, et al. and U.S. Pat. No. 4,302,566 to Karol, et al., both of which are hereby incorporated, in their entireties, by reference thereto. Heterogeneous catalyzed copolymers of ethylene and an α-olefin may include linear low density polyethylene, very low density polyethylene and ultra low density polyethylene. These copolymers of this type are available from, for example, The Dow Chemical Company, of Midland, Mich., U.S.A. and sold under the trademark DOWLEX™ resins. Additionally, the co-polymerization of ethylene and an α-olefin may also be produced by homogeneous catalysis, for example, co-polymerization reactions with metallocene catalysis systems which include constrained geometry catalysts, i.e., monocyclopentadienyl transition-metal complexes taught in U.S. Pat. No. 5,026,798, to Canich, the teaching of which is incorporated herein by reference. Homogeneous catalyzed ethylene/α-olefin copolymers may include ethylene/α-olefin copolymers available from The Dow Chemical Company, known as AFFINITY™ and ATTANE™ resins, TAFMER™ linear copolymers obtainable from the Mitsui Petrochemical Corporation of Tokyo, Japan and ethylene/α-olefin copolymers known as EXACT™ resins obtainable from ExxonMobil Chemical Company of Houston, Tex., U.S.A.

As used herein, the terms "heat-seal", "heat-sealing", "heat-sealable", and the like refer to a first portion of a film surface (i.e. formed from a single layer or multiple layers) which is capable of forming a fusion bond to a second portion of a film surface. A heat-seal layer is capable of fusion bonding by conventional indirect heating means which generate sufficient heat on at least one film contact surface for conduction to the contiguous film contact surface and formation of a bond interface therebetween without loss of the film integrity. It should be recognized that heat sealing can be performed by any one or more of a wide variety of manners, such as using a heat seal technique (e.g., melt-bead sealing, thermal sealing, impulse sealing, ultrasonic sealing, hot air, hot wire, infrared radiation, etc.) and most often involves application of heat and pressure for a time sufficient to create a seal upon cooling.

As used herein, the phrase "innermost exterior-film layer" as applied to film layers of the present invention refers to the exterior-film layer which is closest to the product relative to the other layers of the multilayer film. The phrase "exterior-film layer" as applied to film layers refers to any film layer having less than two of its principal surfaces directly adhered to another layer of the substrate or another substrate. In contrast, the phrase "outermost exterior-film layer", as used herein refers to the exterior-film layer which is furthest from the product relative to the other layers of the multilayer film.

As used herein, the phrase "interior-film layer" as applied to film layers refers to any film layers having both of its principal surfaces directly adhered to another layer of the film.

As used herein, the phrase "gloss" refers to the specular gloss of the films of the present invention, which is a measure of the relative luminous reflectance factor of a specimen in the mirror direction. The relative luminous reflectance factor is the amount of light reflected by the surface of the specimen in reference to a standard and the angle of reflection (20°, 45°, 60° or 85°). Gloss as it refers to the present invention, means that property of a film measured according to ASTM D-2457-03 test method. The specular gloss of the films of the present invention is determined by using BYK Gardner micro TRI Glossmeter.

As used herein, the phrase "haze" refers to that percentage of transmitted light which in passing through the film specimen deviates from the incident beam by forward scattering, and which is measured in accordance with ASTM D-1003-00 test method, a test known to those skilled in the art.

As used herein, the phrase "tie layer" refers to any film layer which functions to adhere two layers to one another. The tie layer may comprise any polymer, copolymer or blend of polymers having a polar group thereon, or any other polymer, copolymer or blend of polymers which provide sufficient interlayer adhesion to adjacent layers comprising otherwise non-adhering polymers. Suitable materials for use as tie layers in the present invention may include, but are not limited to, ionomers, ethylene/vinyl acetate copolymers (E/VA), anhydride-modified ethyl ene/vinyl acetate copolymers ("m-E/VA"), ethylene/methacrylic acid copolymers ("E/MAA"), ethylene/methyl acrylate copolymers (E/MA), ethylene/ethyl acrylate copolymers (E/EA), anhydride-modified ethylene/α-olefin copolymers ("m-E/AO"), anhydride-modified polyolefins, such as anhydride-modified polyethylene ("m-PE"), or a blend thereof.

As used herein, the term "anhydride-modified" refers to any form of anhydride functionality, such as the anhydride of maleic acid, fumaric acid, etc., whether co-polymerized with an anhydride-containing monomer with a second, different monomer, grafted onto a polymer or copolymer, or blended with one or more polymers, and is inclusive of derivatives of such functionalities, such as acids, esters, and metal salts derived therefrom.

As used herein, the phrase "bulk layer" refers to any film layer which serves to increase the abuse resistance, toughness, and modulus of a multilayer film.

As used herein, the phrase "thermoforming-assist layer" refers to any interior-film layer which functions to increase the integrity of the multilayer film while the film is heated and drawn into a cavity during the thermoforming process.

As used herein, the phrase "machine direction" refers to a direction "along the length" of the film, i.e., in the elongate direction of the film as the film is formed during extrusion, lamination, and/or coating.

As used herein, the phrase "transverse direction" refers to a direction across the film, perpendicular to the machine or longitudinal direction.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
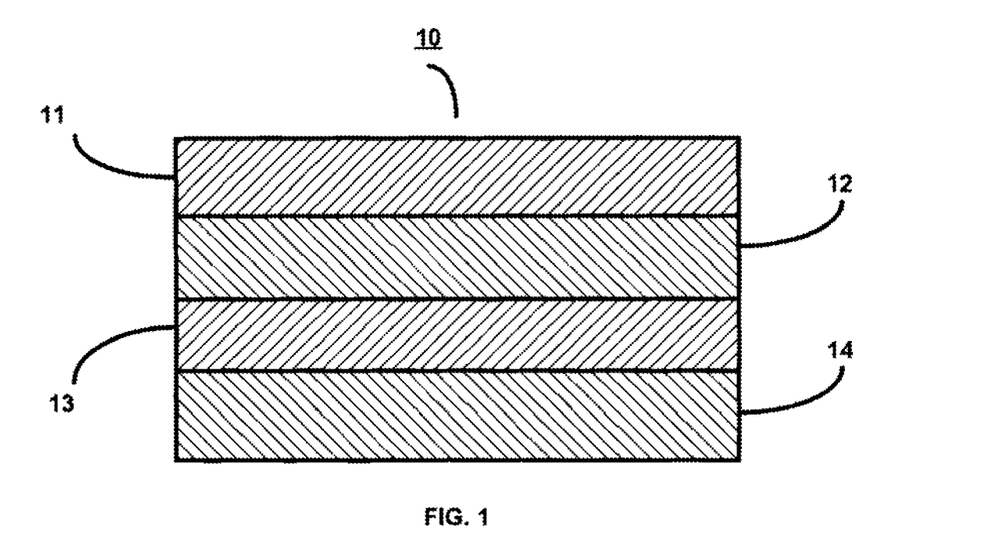
FIG. 1 is a partially schematic, cross-sectional view of one embodiment of a multilayer packaging film according to the present invention comprising four layers.

Referring to FIG. 1 film 10 is a schematic, cross-sectional view of one embodiment of a multilayered film according to the present invention comprising a first polymeric layer 11, a second polymeric layer 12, a third polymeric layer 13, and a fourth polymeric layer 14. Film 10 has four layers: two exterior-film layers (11, 14); and two interior-film layers (12, 13). As depicted, polymeric first layer 11 is an outermost exterior-film layer which may comprise an aliphatic, cycloaliphatic or aromatic polyester, such as, for example, polyethylene terephthalate (PET). Layer 12 is an interior-film tie layer and may comprise any adhesive material which serves to adhere layer 11 and 13 to itself. Preferably, layer 12 comprises an adhesive material derived from copolymers of ethylene and an alkyl acrylate, i.e., for example, ethylene/methyl acrylate copolymers (E/MA). Layer 13 serves as a thermoforming-assist layer and may comprise any polyolefin, preferably, a non-oriented homopolymer or copolymer of polypropylene (PP) or a cross-linked homopolymer or a copolymer of polyethylene (PE). The thermoforming-assist layer may also function to improve the heat resistance of the film. Layer 14 is an innermost exterior-film layer which includes a heat-sealing material, preferably, a heat-sealing polyolefin. Suitable heatsealable polyolefins for use in layer 14 may include, but are not limited to, for example, polyethylene (PE), which includes ultra low-density polyethylene (ULDPE), linear low-density polyethylene (LLDPE), low-density polyethylene (LDPE), medium-density polyethylene (MDPE), polypropylene (PP), ethylene/vinyl acetate (E/VA), copolymers of ethylene or propylene with one or more α-olefins, and ionomers. Other examples of suitable heat-sealable polyolefins include cyclic olefin copolymers (COC), ethylene/propylene copolymers (PE/P), polypropylene (PP), propylene/ethylene copolymer (PP/E), polyisoprene, polybutylene (PB), polybutene-1, poly-3-methylbutene-1, and copolymers of ethylene and 4-methylpentene-1, and the like.

It will be appreciated that films according to the present invention are not limited to the four-layered structure, i.e., layers 11, 12, 13, and 14, provided that layers 11 and 14 are positioned as exterior-film layers and layer 13 is an interior-film layer which functions as a thermoforming-assist layer. Layer 13 may be placed in any position within the film structure and, preferably, is in direct contact with layer 11, by either a fusion bond to layer 11 or through contact with tie layer 12. It is within the scope of the present invention that additional interior layers may be included in the film structure provided that the oxygen transmission of the entire structure does not decrease below 2 cm$^3$/100 in$^2$/24 h. (31 cm$^3$/m$^2$/24 h.) as measured in accordance with ASTM D-3985-02. Thus, the film of this invention may include any number of additional layers in any position between both outermost exterior-film layer 11 and innermost exterior-film layer 14 or between interior-film layer 13 and innermost exterior-film layer 14. It is contemplated that the films of the present invention may comprise at least three layers, and may include a total of four layers, five layers, seven layers, or any number of layers so desired.

Figure 2:
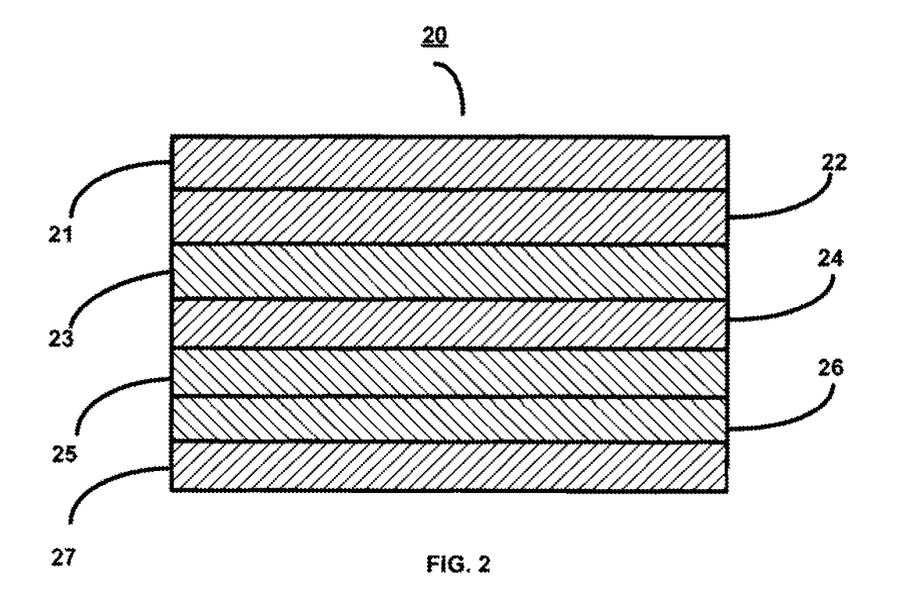
FIG. 2 is a partially schematic, cross-sectional view of another embodiment of a multilayer film according to the present invention comprising seven layers.

Turning now to FIG. 2, film 20 is schematic, cross-sectional view of one embodiment of a multilayered film according to the present invention comprising a seven-layer film structure. Film 20 includes a first polymeric layer 21, a second polymeric layer 22, a third polymeric layer 23, a fourth polymeric layer 24, a fifth polymeric layer 25, a sixth polymeric layer 26, and a seventh polymeric layer 27, in which there exists two exterior-film layers (21, 27), and five interior-film layers (22, 23, 24, 25, 26). Layers 21, 22 and 23 may each have identical compositions and sub-structure as described for layers 11, 12 and 13, respectively, of film 10, as described hereinabove. As depicted, layer 21 is an outermost exterior-film layer and layers 22 and 23 being both interior-film layers which serve as a tie layer and thermoforming-assist layer, respectively. Layers 24 and layer 25 function as bulk layers which are both formed from the same material or different materials. Preferably, layers 24 and 25 comprise any thermoplastic material, more preferably, any polyolefin resin, and most preferably, homopolymers and copolymers of polyethylene (PE), non-oriented polypropylene (PP), polybutylene (PB) or blends thereof. Layer 26 is an interior-film layer which may serve as either a bulk layer or a tie layer. As a bulk layer, layer 26 preferably comprises any thermoplastic material, more preferably, any polyolefin resin, and most preferably, homopolymers and copolymers of polyethylene (PE), non-oriented polypropylene (PP), polybutylene (PB) or blends thereof. As a tie layer, layer 26 preferably comprises any adhesive material which bonds layers 25 and 27 to itself. Suitable polyolefins include, but are not limited to, for example, homopolymers and copolymers of polyethylene (PE), non-oriented polypropylene (PP), polybutylene (PB) or blends thereof. It is preferred that the modified polyolefin comprise anhydride-modified polyolefin, which, but are not limited to, ionomers, ethylene/vinyl acetate copolymers (E/VA), anhydride-modified ethylene/vinyl acetate copolymers (m-E/VA), ethylene/methacrylic acid copolymers (E/MAA), ethylene/methyl acrylate copolymers (E/MA), ethylene/ethyl acrylate copolymers (E/EA), anhydride-modified ethylene/α-olefin copolymers (m-E/AO), anhydride-modified polyolefins, such as anhydride-modified polyethylene (m-PE), or a blend thereof.

It will also be recognized by those skilled in the art that films 10, 20 and any variations thereof may be used to form flexible, semi-rigid and rigid containers, packages, pouches or any portion thereof. In general the films and packages of the present invention can be used in the packaging of any product, the films and packages of the present invention are especially advantageous for the packaging of food products, especially fresh meat products. Among the fresh meat product which can be packaged in the films and packages according to the present invention are poultry, pork, beef, lamb, goat, horse, and fish.

It will be appreciated that the thicknesses of each of films 10, 20 and any variations thereof may vary and equal thicknesses in the FIGS. 1 and 2 are presented only to facilitate illustration.

It will also be appreciated that the films of the present invention have an oxygen transmission rate at 73° F. (23° C.) and 0% R.H. of preferably between 2-1000 cm$^3$/100 in$^2$/24 h. (31-15,500 cm$^3$/m$^2$/24 h.), more preferably, between 10-1000 cm$^3$/100 in$^2$/24 h. (155-15,500 cm$^3$/m$^2$/24 h.), and most preferably, between 20-1000 cm$^3$/100 in$^2$/24 h. (310-15,500 cm$^3$/m$^2$/24 h.) as measured in accordance with ASTM D-3985-02 test method.

The films of the present invention may be formed by any conventional technique for forming films, including extrusion lamination, cast extrusion, extrusion coating, and coextrusion, preferably, extrusion coating, cast coextrusion or blown film coextrusion, and more preferably, cast coextrusion or blown film coextrusion, most preferably, blown coextrusion. The thermoformable film of this invention preferably is made by a conventional blown film process in which the polymers that form the various layers of the film are charged into a conventional melt extruder and extruded through a circular die. For each layer of the film, there is separate extruder and the polymer for that layer is extruded through the circular die that has concentric circular openings in the die for each layer of polymer. Under circumstances in which two layers are the same, one extruder can be used and the polymer stream from the extruder is split before it reaches the circular die. The layers of each of the different polymers are extruded through the opening in the die for that polymer into an air ring in which an air stream is forced through the center of the ring. The air stream expands the polymer streams that are being simultaneously extruded from the die and forces them into intimate contact. A continuous film is formed with the layers of polymer being adhered to each other and formed into a cylindrical multilayer film bubble. The bubble is then quenched e.g., via cooled water bath, solid surface and/or air, and ultimately collapsed by passing through nip rollers, then slit into individual films and each film is wound onto a roll. A typical blown film process that can be used to form the thermoformable film of this invention is described in "Film Extrusion Manual", TAPPI Press, 1992, Thomas I. Butler and Earl Veazey, editors.

The novel film of this invention is primarily used for packaging in which the package is made by a thermoforming process. Depending on the type of components used in the film, shallow draw or deep draw thermoforming can be used. This is done using conventional thermoforming techniques and equipment.

In the practice of this invention, it may be desirable to have one or more layers of the entire film cross-linked to improve the thermoformability, abuse and/or puncture and heat resistance and/or other physical characteristics of the entire film. Crosslinking is the predominant reaction which results in the formation of carbon-carbon bonds between polymer chains. Crosslinking may be accomplished, for example, by ionized radiation means such as high energy electrons, gamma-rays, beta particles and the like, or through chemical means by use of peroxides and the like. More particularly, for crosslinking with ionizing radiation, the energy source can be any electron beam generator operating in a range of about 150 kilovolts to about 6 megavolts with a power output capable of supplying the desired dosage. The voltage can be adjusted to appropriate levels which may be for example 1 to 6 million volts or higher or lower. Many apparatus for irradiating films are known to those skilled in the art. The films of the present invention may be irradiated at a level of from 2-12 Mrads, more preferably 2-5 Mrads. The most preferred amount of radiation is dependent upon the film and its end use.

One method for determining the degree of crosslinking or the amount of radiation absorbed by a material is to measure the gel content in accordance with ASTM D-2765-01 which is hereby incorporated, in its entirety, by reference. Gel content corresponds to the relative extent of crosslinking within a polymeric material having undergone irradiation.

Preferably, the coextruded multilayered packaging film of the present invention can have any total film thickness desired, preferably thicknesses may range between 0.8-15 mils (20.32-381 μm), more preferably, between 0.8-10 mils (20.32-254 μm), and most preferably, between 0.8-8.0 mil (20.32-203.2 μm).

EXAMPLES

The invention is illustrated by the following examples, which are provided for the purpose of representation, and are not to be construed as limiting the scope of the invention.

Unless otherwise noted, the thermoplastic resins utilized in the present invention are generally commercially available in pellet form and, as generally recognized in the art, may be melt blended or mechanically mixed by well-known methods using commercially available equipment including tumblers, mixers or blenders. Also, if desired, well known additives such as processing aids, slip agents, anti-blocking agents and pigments, and mixtures thereof may be incorporated into the film, by blending prior to extrusion. The resins and any additives are introduced to an extruder where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

For the following examples, a single slash, "/", represents the division between individual layers within a film structure.

Film 1

Film 1 is one embodiment of the present invention of a film having seven layers (see film 20 in FIG. 2). The first polymeric layer (21) comprised a mixture of polyester, anti-block additive and slip additive. The polyester comprised polyethylene terephthalate copolymer having a density of 1.4 g/cm$^3$, a melting point of 240° C., a tensile strength at break (machine direction/transverse direction) of 8.4/5.6 kpsi, and is available under the trademark Voridian™ Polymer 9921 from Eastman Chemical Company, Kingsport, Tenn., U.S.A. In Example 1, the second layer (22) was a tie layer comprising ethylene/methyl acrylate copolymer (E/MA) and modified linear low-density polyethylene (m-LLDPE). The ethylene/methyl acrylate copolymer has a density of 0.948 g/cm$^3$, a Vicat softening point of 49° C., a melt index of 2.0 g/10 min., and is available from Eastman Chemical Company, Kingsport, Tenn., U.S.A. The modified linear low-density polyethylene was an anhydride linear low-density polyethylene having a having a density of 0.92 g/cm³, a melting point of 125° C., a melt index of 1.5 g/10 min., a Vicat softening point of 102° C., and is available under the trademark Bynel® from E. I. du Pont de Nemours and Company, Wilmington, Del., U.S.A. The third layer (23) and the sixth layer (26) each comprised a non-oriented polypropylene random copolymer (PP) having a melt index of 2 g/10 min., a tensile strength at break of 4.5 kpsi, and is sold as Grade 8244 from BP Amoco Polymers, Inc., Naperville, Ill., U.S.A. The fourth layer (24) and the fifth layer (25) each comprised an ultra low-density polyethylene (ULDPE), particularly, an ethylene/octene α-olefin copolymer (E/AO) having a density of 0.912 g/cm³, a melting point of 123° C., a melt index of 1.0 g/10 min., a Vicat softening point of 93° C., a is available under the trademark ATTANE 4201G from The Dow Chemical Company, Midland, Mich., U.S.A. The seventh layer (27) comprised polyethylene (PE) and anti-block additive. The polyethylene was identical to that used in the fourth and fifth layers of the film. The Example 1 was produced having an overall film thickness of about 5 mil and with the following structure and relative layer thicknesses, beginning with the outermost exterior-film layer and going to the innermost exterior-film layer (left to right):

5% PET/15% E/MA/10% PP/12% PE/8% PE/27% PP/23% PE

Example 1 had an oxygen transmission rate at 73° F. (23° C.) and 0% R.H. of 40 cm³/100 in²/24 h. (620 cm³/m²/24 h.) as measured in accordance with ASTM D-3985-02 test method.

Film 2

Film 2 is another example of a seven-layer embodiment of the present invention. All the film layers are identical in structure and relative layer thickness as that used in Example 1, except that the overall film thickness was about 8 mil.

Example 2 had an oxygen transmission rate at 73° F. (23° C.) and 0% R.H. of 20 cm³/100 in²/24 h. (310 cm³/m²/24 h.) as measured in accordance with ASTM D-3985-02 test method.

Thermoforming experiments were performed with the films of the present invention using conventional thermoforming equipment. The thermoforming equipment included a female component or forming die. Energy was supplied to the films to be thermoformed by an infrared source. Intimate contact between the film and the forming die was facilitated by the application of a vacuum between the depressions or cavity of the forming die and the film. In a first experiment, the thermoforming equipment included a single-cavity forming die having a rectangular geometry of 45 mm by 100 mm by 18 mm. In a second experiment, the forming equipment was a Hydro-Trim Labform II-B thermoformer supplied by the Hydro-Trim Corp., West Nyack, N.Y., USA which included a plurality of convex depressions in the forming die. In each case, the infrared source was superimposed over the forming die and heated the film to a temperature where it became observably soft or pliable. For the film samples examined in Thermoforming Experiment 1, the temperature of the film was estimated by a thermocouple disposed between the film and the infrared source. For the film samples examined in Thermoforming Experiment 2, the temperature of the infrared source was measured by a thermocouple contacting the source. In each experiment, the temperature and heating time were varied.

Thermoforming Experiment 1

In Experiment 1, thermoforming experiments were performed using the single-cavity thermoformer and samples of Film 1 according to the present invention and a film comprising biaxially oriented polypropylene (BOPP), ExxonMobil Bicor® 75 SLP OPP film. Each film specimen was placed onto the thermoformer and the thermocouple temperature used to estimate the film temperature, heating time and observations were recorded. Table 1 illustrates the results obtained.

TABLE 1

| Temperature | Heating Time | Percent of available film area thermoformed | |
|---|---|---|---|
| (° F.) | (sec.) | Film 1 | BOPP |
| 220 | 2.5 | 100% | <10% |
| 220 | 5.0 | 100% | <10% |
| 220 | 7.5 | 100% | <10% |
| 220 | 10.0 | 100% | <10% |
| 235 | 2.5 | 100% | <10% |
| 235 | 5.0 | 100% | <10% |
| 235 | 7.5 | 100% | <10% |
| 235 | 10.0 | 100% | <10% |
| 260 | 2.5 | 100% | <10% |
| 260 | 5.0 | 100% | <10% |
| 260 | 7.5 | 100% | <10% |
| 260 | 10.0 | 100% | <10% |
| 275 | 2.5 | 100% | <10% |
| 275 | 5.0 | 100% | <10% |
| 275 | 7.5 | 100% | <10% |
| 275 | 10.0 | 100% | <10% |
| 315 | 2.5 | 100% | 10% |
| 315 | 5.0 | 100% | 10% |
| 315 | 7.5 | 100% | 10% |
| 315 | 10.0 | 100% | 10% |

As shown in Table 1, 100% of the available film area of Film 1 conformed to the shape of the die cavity at each temperature setting and heating time. In contrast, less than 10% of the available film area of the biaxially oriented polypropylene film conformed between temperatures ranging from 220 to 275° F. At 315° F., about 10% of the available film area of the biaxially oriented polypropylene film conformed to the shape of the forming die. A sealed package was formed using one the thermoformed specimens of Film 1 by heat sealing the entire non-thermoformed area of the specimen to a second gas impermeable film containing aluminum foil. The mean oxygen transmission rate of the sealed package was measured by securing the package to a Mocon OX-TRAN® oxygen permeability tester model 2/20. The mean oxygen transmission rate of the sealed package was 39 cm³/100 in² day.

Thermoforming Experiment 2

In Experiment 2, thermoforming experiments were performed using a Hydro-Trim Labform II-B thermoformer and samples of Film 1 according to the present invention and a film comprising biaxially oriented polypropylene (BOPP), ExxonMobil Bicor® 75 SLP OPP film. Each film specimen was placed onto the thermoformer and the infrared source temperature, heating time and observations were recorded. Table 2 illustrates the results obtained.

TABLE 2

| Temperature (° F.) | Heating Time (sec.) | Percent of available film area thermoformed | |
|---|---|---|---|
| | | Film 1 | BOPP |
| 300 | 3.0 | — | <10% |
| 300 | 4.0 | — | <10% |
| 300 | 5.0 | — | <10% |
| 300 | 6.0 | — | <10% |
| 400 | 6.0 | — | <10% |
| 500 | 6.0 | 100% | <10% |
| 500 | 7.0 | 100% | <10% |
| 600 | 7.0 | 100% | <10% |
| 600 | 8.0 | 100% | <10% |
| 625 | 7.0 | 100% | <10% |
| 650 | 7.0 | 100% | 0% (melt-through) |
| 700 | 7.0 | 100% | 0% (melt-through) |
| 700 | 8.0 | 100% | 0% (melt-through) |

Film 1 of the present invention fully formed into the die shape beginning at 500° F. and 6.0 sec. heating time and continued to form until the temperature and heating temperature reached 700° F. and 8.0 seconds, respectively. In contrast, the biaxially oriented polypropylene film slightly deformed from temperatures between 300 to 625° F., and at a temperature of 650° F. and heating time of 7.0 seconds, the film melted through the forming die cavity. It should be evident from the data presented above that the films of the present invention comprising non-oriented polypropylene film layers provide an advantage of being fully thermoformable over biaxially oriented polypropylene containing film layers since no more than 10% of the available area of the latter can be thermoformed over the same temperature range as the former.

Unless otherwise noted, the physical properties and performance characteristics reported herein were measured by test procedures similar to the following methods. The following ASTM test procedures are each incorporated herein by reference in their entireties:

| | |
|---|---|
| Density | ASTM D-1505 |
| Gel Content | ASTM D-2765-01 |
| Gloss | ASTM D-2457-03 |
| Haze | ASTM D-1003-00 |
| Unrestrained Linear Thermal Shrinkage | ASTM D-2732-96 |
| Melt Index | ASTM D-1238 |
| Melting Point | ASTM D-3417 |
| Oxygen Transmission Rate | ASTM D-3985-02 |
| Tensile Strength at Break | ASTM D-882 |
| Vicat Softening Temperature | ASTM D-1525 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A thermoformable coextruded breathable packaging non-oriented film comprising:

(a) at least a first polymeric layer, a second polymeric layer, a third polymeric layer, a fourth polymeric layer, a fifth polymeric layer and a sixth polymeric layer;

(b) wherein said first polymeric layer is an outermost exterior-film layer and comprises a polyester selected from the group consisting of aliphatic polyesters, cycloaliphatic polyesters, polyethylene terephthalate (PET), polyethylene terephthalate glycol (PETG), polypropylene terephthalate (PPT), polybutylene terephthalate (PBT) and blends thereof;

(c) wherein said second polymeric layer is directly contacting said first and third polymeric layers and comprises a polyalkyl acrylate copolymer or blend thereof;

(d) wherein said third polymeric layer is directly contacting said second and fourth polymeric layers and comprises either a polypropylene or cross-linked polyethylene;

(e) wherein said fourth polymeric layer is directly contacting said third and fifth polymeric layers and consisting essentially of polyethylene;

(f) wherein said fifth polymeric layer is directly contacting said fourth and sixth layers and consisting essentially of polypropylene;

(g) wherein said sixth polymeric layer is an innermost exterior-filer layer and comprises a heat-sealable polyolefin;

(h) wherein said film has an oxygen transmission rate at 73° F. (23° C.) and 0% R.H. of between 32-1000 cm³/100 in²/24 h. (500-15,500 cm³/m²/24 h.) as measured in accordance with ASTM D-3985-02 test method; and (i) wherein said film comprises an unrestrained linear thermal shrinkage at 80° C. of 0-5% in both the machine and transverse direction as measured in accordance with ASTM D-2732-96 test method.

2. A thermoformable coextruded packaging film according to claim 1, wherein said film is formed by blown film coextrusion.

3. A thermoformable coextruded breathable packaging non-oriented film comprising:

(a) at least a first polymeric layer, a second polymeric layer, a third polymeric layer, a fourth polymeric layer, a fifth polymeric layer, a sixth polymeric layer, and a seventh polymeric layer;

(b) wherein said first polymeric layer is an outermost exterior-film layer and comprises a polyester selected from the group consisting of aliphatic polyesters, cycloaliphatic polyesters, polyethylene terephthalate (PET), polyethylene terephthalate glycol (PETG), polypropylene terephthalate (PPT), polybutylene terephthalate (PBT) and blends thereof;

(c) wherein said second polymeric layer is directly contacting said first and third polymeric layers and comprises a polyalkyl acrylate copolymer of blend thereof;

(d) wherein said third polymeric layer is directly contacting said second and fourth polymeric layers and comprises either a polypropylene or cross-linked polyethylene;

(e) wherein said fourth polymeric layer is directly contacting said third and fifth polymeric layers and consisting essentially of polyethylene;

(f) wherein said fifth polymeric layer is directly contacting said fourth and sixth polymeric layers and consisting essentially of polyethylene;

(g) wherein said sixth polymeric layer is directly contacting said fifth and seventh polymeric layers and consisting essentially of polypropylene;

(h) wherein said seventh polymeric layer is an innermost exterior-film layer comprising a heat-sealable polyolefin;

(i) wherein said film has an oxygen transmission rate at 73° F. (23° C.) and 0% R.H. of between 32-1000 cm$^3$/100 in$^2$/24 h. (500-15,500 cm$^3$/m$^2$/24 h.) as measured in accordance with ASTM D-3985-02 test method; and (j) wherein said film comprises an unrestrained linear thermal shrinkage at 80° C. of 0-5% in both the machine and transverse direction as measured in accordance with ASTM D-2732-96 test method.

4. A thermoformable coextruded packaging film according to claim 3, wherein said film is formed by blown film coextrusion.

5. A thermoformable coextruded packaging film according to claim 3, wherein said first polymeric layer, said second polymeric layer, said third polymeric layer, said fourth polymeric layer, said fifth polymeric layer, said sixth polymeric layer, and said seventh polymeric layer are free of polyamide.

6. A thermoformable coextruded packaging film according to claim 3, wherein said film comprises a gloss value at 45° of at least 60% as measured in accordance ASTM D-2457 test method.

7. A thermoformable coextruded packaging film according to claim 3, wherein said film comprises a haze value of less than 20% as measured in accordance with ASTM D-1003-00 test method.

8. A thermoformable coextruded packaging film according to claim 3, wherein said film has an oxygen transmission rate at 73° F. (23° C.) and 0% R.H. of between 40-1000 cm$^3$/100 in$^2$/24 h. (620-15,500 cm$^3$/m$^2$/24 h.) as measured in accordance with ASTM D-3985-02 test method.

9. A thermoformable coextruded packaging film according to claim 3, wherein said polyalkyl acrylate copolymer comprises an ethylene/alkyl acrylate copolymers or blends thereof.

10. A thermoformable coextruded packaging film according to claim 9, wherein said ethylene/alkyl acrylate copolymers comprise a material selected from the group consisting of ethylene/methyl acrylate copolymer (E/MA), ethylene/ethyl acrylate copolymer (E/EA), ethylene/butyl acrylate copolymer (E/BA), and ethylene/methyl methacrylate copolymer (E/MMA).

11. A thermoformable coextruded packaging film according to claim 3, wherein said second layer further comprises an anhydride modified-polyethylene.

12. A thermoformable coextruded packaging film according to claim 3, wherein said heat-sealable polyolefin comprises polyethylene.

13. A thermoformable coextruded packaging film according to claim 3, wherein said film has a thickness range between 0.8-15 mils (20.32-381 μm).

14. A thermoformable coextruded packaging film according to claim 13, wherein said film has a thickness range between 0.8-10 mils (20.32-254 μm).

15. A thermoformable coextruded packaging film according to claim 14, wherein said film has a thickness range between 0.8-8.0 mil (20.32-203.2 μm).

16. A thermoformable coextruded packaging film according to claim 3, wherein said film forms a package or a portion thereof.

* * * * *

UNITED STATES PATENT AND TRADEMARK OFFICE
CERTIFICATE OF CORRECTION

PATENT NO. : 8,449,984 B2  
APPLICATION NO. : 12/326959  
DATED : May 28, 2013  
INVENTOR(S) : Andrew John Lischefski et al.

Page 1 of 1

It is certified that error appears in the above-identified patent and that said Letters Patent is hereby corrected as shown below:

In the Specification

In column 3, line 18, delete "too," and insert -- to, --, therefor.

In column 3, line 57, delete "h," and insert -- h. --, therefor.

In column 3, line 63, delete "(01013" and insert -- (0.1013 --, therefor.

In column 4, line 56, delete "[R-(O)O-R']" and insert -- [R-C(O)O-R'] --, therefor.

In column 5, line 4, delete "diethylorthopbthalic" and insert -- diethylorthophthalic --, therefor.

In column 6, line 13, delete "(i.e." and insert -- (i.e., --, therefor.

In column 6, line 65, delete "ethyl ene" and insert -- ethylene --, therefor.

In column 7, line 36, delete "FIG. 1" and insert -- FIG. 1, --, therefor.

In column 12, line 2, delete "beating" and insert -- heating --, therefor.

In the Claims

In column 15, line 22, in claim 6, delete "ASTM" and insert -- with ASTM --, therefor.

Signed and Sealed this  
Twenty-third Day of June, 2015

Michelle K. Lee  
*Director of the United States Patent and Trademark Office*